J. ROSE & P. BENJAMIN.
Chromatic Tempering Scale.
No. 205,578.    Patented July 2, 1878.
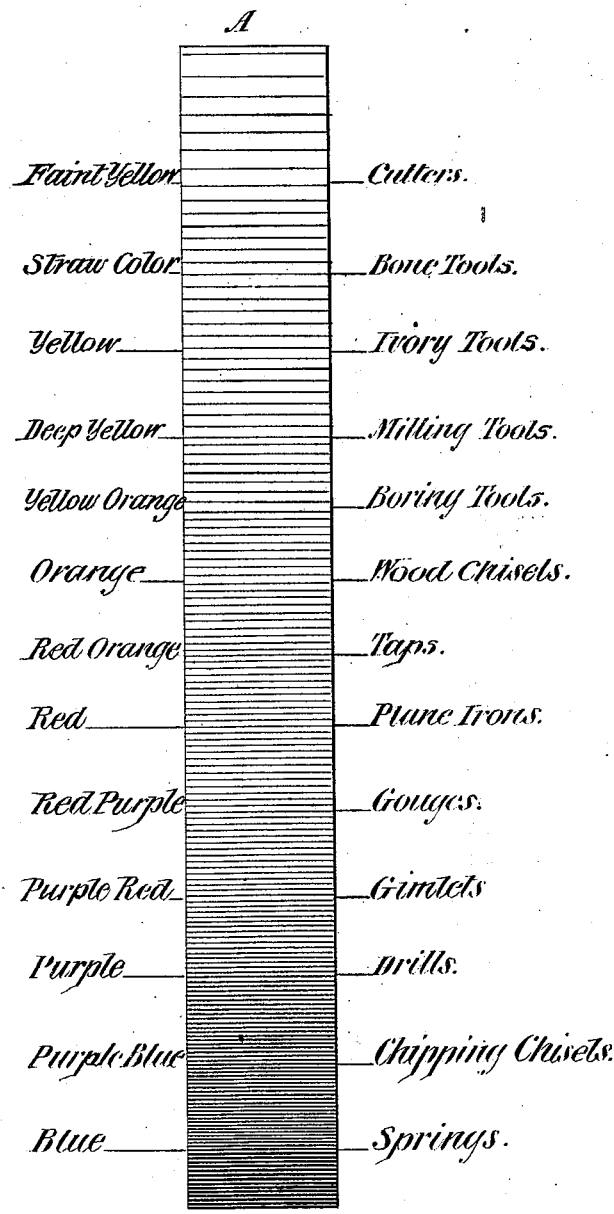

UNITED STATES PATENT OFFICE.

JOSHUA ROSE AND PARK BENJAMIN, OF NEW YORK, N. Y.

IMPROVEMENT IN CHROMATIC TEMPERING-SCALES.

Specification forming part of Letters Patent No. 205,578, dated July 2, 1878; application filed January 25, 1878.

*To all whom it may concern:*

Be it known that we, JOSHUA ROSE and PARK BENJAMIN, of the city, county, and State of New York, have invented a new and Improved Chromatic Tempering-Scale, of which the following is a specification:

Our invention consists in a printed fac-simile or close imitation of the gradations of color, tint, or hue which appear on the surface of hardened steel or other metal when reheated, the said fac-simile having printed upon or in close proximity to it characters, letters, words, or figures denoting the shade of color indicating the temper appropriate to the various tools, implements, and objects known and employed in the arts.

The object of the invention is to furnish the metal-worker with a reliable scale or guide, whereby he may temper various tools to the proper degree by comparing the colors produced by heat on the surface of the tools with the color indicated on the scale as appropriate to such tools.

The drawing represents an isolated example of our tempering-scale, and it is supposed to exhibit all of the colors assumed by polished steel during the process of tempering, the colors being approximately as thereon indicated by names on the left of the scale, and blended into each other by intermediate graduations.

On the right of the scale we have inscribed the names of certain tools or articles well known to artisans, the name of each tool being supposed to be opposite the particular color to which the tool is required to be "drawn" to give it the proper temper for its intended use.

The scale is produced by chromolithography or an analogous process, and represents all of the gradations of colors that may be produced on the surface of steel in the process of tempering.

Of course, we do not limit ourselves in our claim to a scale with the particular category of tools inscribed upon our present illustration, as it is obvious that it may be used to indicate the temper of any and all tools, articles, or implements that require to be tempered to adapt them for use.

Having thus described our invention, we claim as new and desire to secure by Letters Patent—

A chromatic tempering-scale having the colors or gradations of color assumed by steel in the process of tempering, and having letters, characters, or words printed upon it or in proximity to it to indicate the color appropriate to the tool or article to be tempered, substantially as herein specified.

JOSHUA ROSE.
PARK BENJAMIN.

Witnesses:
C. SEDGWICK,
J. H. SCARBOROUGH.